United States Patent [19]
Ueyama et al.

[11] Patent Number: 5,534,322
[45] Date of Patent: Jul. 9, 1996

[54] RECORDING MEDIUM

[75] Inventors: Kenichi Ueyama; Hiroshi Kawamukai, both of Tochigi-ken, Japan

[73] Assignee: Kao Corporation, Tokyo, Japan

[21] Appl. No.: 231,749

[22] Filed: Apr. 25, 1994

[30] Foreign Application Priority Data

Jun. 29, 1993 [JP] Japan ..................... 5-158388
Mar. 25, 1994 [JP] Japan ..................... 6-055725

[51] Int. Cl.$^6$ .................. B32B 3/02; B32B 9/04; B32B 27/30; G11B 5/66
[52] U.S. Cl. ............ 428/64.2; 428/64.3; 428/65.1; 428/65.3; 428/65.5; 428/694 TP; 428/694 TC; 428/694 BP; 428/694 BF; 428/694 ML; 428/694 DE; 428/694 AH; 428/447; 428/522; 428/704; 428/900
[58] Field of Search ............. 428/694 TP, 694 TC, 428/694 BP, 694 BF, 900, 447, 522, 704, 694 ML, 694 DE, 694 AM, 64.2, 64.3, 65.1, 65.3, 65.5

[56] References Cited

U.S. PATENT DOCUMENTS

| | | | |
|---|---|---|---|
| 4,770,924 | 9/1988 | Takai | 428/212 |
| 4,900,622 | 2/1990 | Nakayama | 428/336 |
| 4,981,743 | 1/1991 | Ho | 428/64 |
| 4,992,300 | 2/1991 | Ogawa | 427/44 |
| 5,128,216 | 7/1992 | Ng | 428/695 |
| 5,137,784 | 8/1992 | Suzuki | 428/408 |
| 5,178,954 | 1/1993 | Norman | 428/422 |
| 5,268,227 | 12/1993 | Nishikawa | 428/336 |
| 5,270,109 | 12/1993 | Nishikawa | 428/336 |
| 5,395,696 | 3/1995 | Ishida | 428/408 |

*Primary Examiner*—Leszek Kiliman
*Attorney, Agent, or Firm*—Oblon, Spivak, McClelland, Maier & Neustadt

[57] ABSTRACT

A recording medium, showing sufficient resistance to contamination and having excellent reproducing characteristics, comprises a film provided on a surface thereof and this film comprises a copolymer formed by polymerizing a composition which comprises a compound A having a (meth)acryloyl group and a reactive antistatic agent B having a quaternary ammonium salt group, an alkylene glycol chain, a hydrocarbon group of which carbon number is four or more and a copolymerizable group.

19 Claims, 1 Drawing Sheet

RECORDING MEDIUM

BACKGROUND OF THE INVENTION

The present invention relates to a recording medium such as a magnetic disk, a magneto optical disk or an optical disk, etc.

As materials for an optical disk substrate, polycarbonate or polymethyl methacrylate are proposed from the view points of forming or transparency.

By the way, such plastic materials have the following weak points.

(1) Insufficient in resistance to scuffing.

(2) Easy to be charged by static electricity.

(3) Easy to be adhered by dust and dirt.

For the above reasons, it is proposed to provide a film that is transparent, rich in resistance to scuffing and has electrostatic protection ability on the surface of recording medium.

A method, for example, is known to provide a hard coating film added by a conductive filler on the surface. Also, a method to provide a hard coating film mixed by a surface active agent is known.

For the former, however, a large amount of conductive filler must be added to meet electrostatic protection characteristics. As the result, its optical characteristics (transparency) or hardness is deteriorated. Additionally, it becomes difficult to perform coating work.

For the latter, it is difficult to expect sufficient effect under low humidity. Also, it has some other problems such as cloudiness or loss of electrostatic protection ability because of occurrence of bleeding phenomenon.

For dealing with such problems, for example, an coating material (a mixture of thiocyanate, an anionic surface active agent having an alkylene glycol chain, a copolymerizable (meth)acrylate and optical polymerization initiator) is proposed (Japanese Patent Laid-Open No.4-80266(1992)). In addition to this, electrostatic preventive compositions are proposed in Japanese Patent Laid-Open No.4-33968(1992) and Japanese Patent Laid-Open No.3-275705 (1991).

A composition by the above proposals, however, has not sufficient electrostatic preventive ability.

Additionally, contamination is not caused only by adherence of dust or dirt by static electricity. There is, however, contamination by oil adhesive materials or water soluble adhesive materials.

For avoiding such contamination and for easily removing it, it is necessary to reduce surface energy of the coating materials.

By the way, surface energy of the above-mentioned materials for treating the surface is high, so that contamination by adherence of oil adhesive materials or water soluble adhesive materials can not be ignored.

SUMMARY OF THE INVENTION

An object of the present invention is to provide a novel and improved recording medium having improved contamination resistance and improved reproducing characteristics.

The object of the present invention is achieved by a recording medium comprising a film provided on a surface of said recording medium, wherein said film comprises a copolymer formed by polymerizing a composition which comprises:

(a) a compound A having a (meth)acryloyl group; and (b) a reactive antistatic agent B having a quaternary ammonium salt group, an alkylene glycol chain, a hydrocarbon group of which carbon number is four or more, and a copolymerizable group.

Moreover, it is achieved by the recording medium comprising a film provided on a surface of said recording medium, wherein said film comprises the above-mentioned copolymer and an oligomer O, wherein said oligomer has not a copolymerizable group but a quaternary ammonium salt group, an alkylene glycol chain and a hydrocarbon group of which carbon number is four or more.

It is to be noted that it is desirable that length of the alkylene glycol chain in the oligomer O is 1 to 25, preferably 4 to 20.

For forming this oligomer O, the following monomers (a), (b) and (c) are listed up:

(a) 5 to 70% by weight (preferably 5 to 50% by weight) of a monomer represented by the following formula $[O_{10}]$

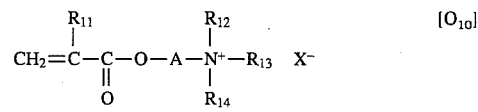

(where, $R_{11}$ represents H or $CH_3$. $R_{12}$, $R_{13}$, $R_{14}$ represent H, alkyl group (especially alkyl group of which carbon number is in 1 to 9) or hydroxy-alkyl group (especially hydroxy-alkyl group of which carbon number is in 1 to 9). A represents alkylene group (especially alkylene group of which carbon number is in 1 to 10) or hydroxy-alkyl group (especially hydroxy-alkyl group of which carbon number is in 1 to 10). $X^{31}$ represents an anion, for example, $CH_3SO_4^{31}$, $C_2H_5SO_4^{31}$, $Cl^{31}$, $Br^{31}$, $H_2PO_4^{31}$, $H_2PO_4^{31}$, $CH_3COO^{31}$, $CH_3SO_3^{31}$, $NO_2^{31}$, etc. (preferably, $CH_3SO_4^{31}$, $C_2H_5SO_4^{31}$, $Cl^{31}$, $Br^{31}$));

(b) 10 to 80% by weight of a monomer represented by the following formula $[O_2]$

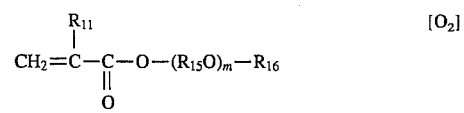

(where, $R_{11}$ represents H or $CH_3$. $R_{15}$ represents alkylene group (especially alkylene group of which carbon number is in 2 to 4). $R_{16}$ represents H, alkyl group (especially alkyl group of which carbon number is in 1 to 10) or aryl group (especially aryl group of which carbon number is in 6 to 10). m is an integer in a range of 1 to 25.); and (c) 10 to 70% by weight (desirably 10 to 40% by weight) of a monomer represented by the following formula $[O_3]$

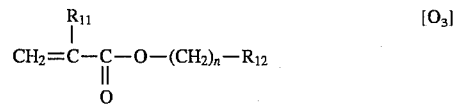

where, $R_{11}$ represents H or $CH_3$. $R_{12}$ represents H or (meth)acryloyl group. n is an integer in a range of 4 to 30.)

By reacting the above monomers (a), (b) and (c), the oligomer O is obtained.

It is also possible to use the following monomers (a'), (b) and (c):

(a') 5 to 70% by weight (desirably 5 to 50% by weight) of an amine monomer represented by the following formula [O_{11}]

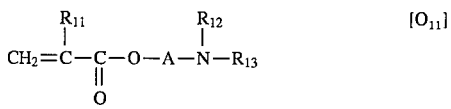

(where, $R_{11}$ represents H or $CH_3$. $R_{12}$, $R_{13}$ represent H, alkyl (especially alkyl group of which carbon number is in 1 to 9) group or hydroxy-alkyl group (especially hydroxy-alkyl group of which carbon number is in 1 to 9). A represents alkylene group (especially alkylene group of which carbon number is in 1 to 10) or hydroxy-alkyl group (especially hydroxy-alkyl group of which carbon number is in 1 to 10).);

(b) 10 to 80% by weight of a monomer represented by the above-mentioned formula [$O_2$].

(c) 10 to 70% by weight (desirably 10 to 40% by weight) of a monomer represented by the above-mentioned formula [$O_3$].

By reacting the above monomers (a'), (b) and (c), followed by quaternarizing, then the oligomer O is obtained.

Where, as the quaternarizers, the following are can be used. For, example, alkylsulfuric acids such as dimethyl sulfuric acid, diethyl sulfuric acid, dipropyl sulfuric acid, sulfonates such as p-toluensulfonmethyl, benzensulfonmethyl, alkyl phosphoric acid such as trimethyl phosphate, and halides such as alkyl benzene chloride, benzyl chloride, alkyl chloride and alkyl bromide.

And, as the amine monomers, the following tertiary amine can be listed up: dimethylamino(meth)acrylate, diethylamino(meth)acrylate, dimethylaminopropyl(meth)acrylate, dimethylaminobutyl(meth)acrylate, dihydroxyethylaminoethyl (meth)acrylate, dipropylaminoethyl(meth)acrylate, dibutylaminoethyl(meth)acrylate.

The object of the present invention is achieved by a recording medium comprising, on its surface, a film polymerized by using the above compound A, the above reactive antistatic preventive agent B and a silicone C.

More, the object of the present invention is achieved by a recording medium comprising, on its surface, a film polymerized by using the above compound A, the above reactive antistatic preventive agent B, the above oligomer O and the silicone C.

For the compound A (it is possible monomer or oligomer) used by the present invention, it is preferable to use the compound selected from a group of (meth)acrylate having three or more (meth)acryloyl groups and (meth)acrylate having two (meth)acryloyl groups and an ethylene glycol chain. At least, it is preferable to use a compound having two or more (meth)acryloyl groups. By using a cross-linkable compound having two or more functional groups, a disk having good resistance to scuffing and surface protective effect can be obtained. It is to be noted that (meth)acryloyl means acryloyl or methacryloyl in the present invention.

Especially, it is preferable that the compound A comprises:

(a) a compound $A_1$ selected from a group of (meth)acrylate having three or more (meth)acryloyl groups; and (b) a compound $A_2$ selected from a group of (meth)acrylate having two (meth)acryloyl groups and an ethylene glycol chain;

wherein, the ratio of $A_2$ is in the range of 10 to 100 part by weight per $A_1$ of 100 part by weight.

It is to be noted that copolymarizable mono-functional (meth)acrylate can be used further in addition to these multi-functional (meth)acrylate.

For example, a mixture comprising 20 to 95% by weight (desirably 50 to 70% by weight) of compound $A_1$, 5 to 50% by weight (desirably 20 to 40% by weight) of compound $A_2$ and not more than 30% by weight (0 to 30% by weight) of copolymerizable mono-functional (meth)acrylate can be listed up. Especially, for the compound A, a mixture comprising 20 to 95% by weight (desirably 50 to 70% by weight) of three or more multi-functional (meth)acrylate $A_1$, 5 to 50% by weight (desirably 20 to 40% by weight) of di-functional (meth)acrylate, especially polyethylene glycol di(meth)acrylate $A_2$, if necessary, not more than 30% by weight (0 to 30% by weight) of mono-functional (meth)acrylate can be listed up. It is preferable that the ethylene glycol chain length of $A_2$ is in 2 to 20.

As the three or more multi-functional (meth)acrylate (=compound $A_1$), for example, the following are listed up: trimethylolpropane tri(meth)acrylate, trimethylolethane tri(meth)acrylate, ditrimethylolpropane tetra(meth)acrylate, glycerin tri(meth)acrylate, pentaerythlytol tri(meth)acrylate, pentaerythlytol tetra(meth)acrylate, dipentaerythlytol penta(meth)acrylate, dipentaerythlytol hexa(meth)acrylate and its ethylene oxide or propylene oxide modified.

As the di-functional (meth)acrylate, for example, the following can be listed up: 1,3-butanediol di(meth)acrylate, 1,4-butanediol di(meth)acrylate, 1,6-hexanediol di(meth)acrylate, diethylene glycol di(meth)acrylate, polyethylene glycol di(meth)acrylate, neopentyl glycol di(meth)acrylate, cyclopentadiethylalcohol di(meth)acrylate. Therefore, as the polyethylene glycol di(meth)acrylate (=compound $A_1$), the above di-functional (meth)acrylate added by polyethylene glycol length are in 2 to 20 can be listed up.

Further, polyester poly(meth)acrylate, epoxy(meth)acrylate, urethane poly(meth)acrylate, polysiloxane poly(meth)acrylate, polyamide poly(meth)acrylate can be used.

For controlling of viscosity and improvement of adhesion to substrate, it is preferable to use the following monomers, for example: 2-hydroxyethyl(meth)acrylate, 2-hydroxypropyl(meth)acrylate, 3-hydroxybutyl(meth)acrylate, 4-hydroxybutyl(meth)acrylate, 2-hydroxypentyl(meth)acrylate, 4-hydroxypentyl (meth)acrylate, 2-ethylhexyl(meth)acrylate, ethoxyethyl (meth)acrylate, N-hydroxymethyl-(meth)acrylamide, N-methoxymethyl(meth)acrylamide.

For the reactive antistatic preventive agent B used by the present invention, it is preferable to use a compound represented by the following formula [$B_x$] that has at least one reactive group selected from a group of vinyl group and allyl group.

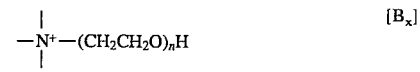

(where, n is an integer in a rage of 1 to 25.)

Especially, the reactive antistatic agent B represented by the following formula [$B_1$] is preferable.

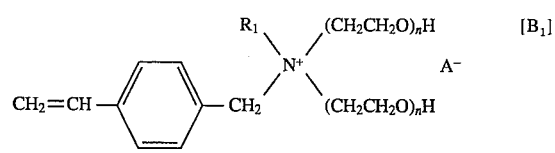

(where, $R_1$ represents hydrocarbon group of which carbon number is four or more. $A^{31}$ represents an anion. n is an integer in a rage of 1 to 25.)

Further, it is possible to use the reactive antistatic agent B represented by the following formula [$B_2$].

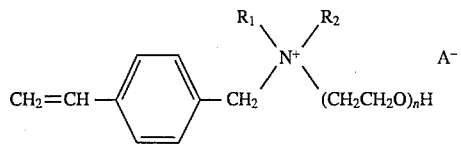

(where, $R_1$ and $R_2$ represents hydrocarbon group of which carbon number is four or more. $A^{31}$ represents an anion. n is an integer in a rage of 1 to 25.)

Also, the reactive antistatic agent B represented by the following formula [$B_3$] is preferable.

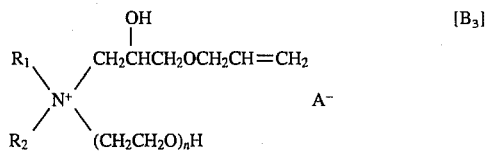

(where, $R_1$ and $R_2$ represent hydrocarbon group of which carbon number is four or more. $A^{31}$ represents an anion. n is an integer in a rage of 1 to 25.)

Further, it is possible to use the reactive antistatic agent B represented by the following formula [$B_4$].

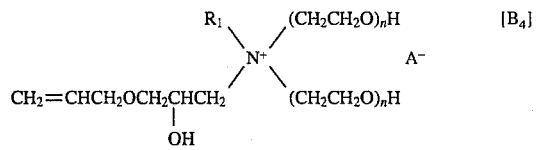

(where, $R_1$ and $R_2$ represent hydrocarbon group of which carbon number is four or more. $A^{31}$ represents an anion. n is an integer in a rage of 1 to 25.)

The reactive antistatic agent B has a quaternary ammonium salt group, an alkyleneglycol chain, a hydrocarbon group of which carbon number is 4 or more and copolymerizable reactive group.

Where, the hydrocarbon group of which carbon number is 4 or more is necessary to promote phase separation (separation to the surface). Where, the hydrocarbon can have any structure, for example, saturated, unsaturated, straight-chain, branched chain or cyclic structure. However, it is preferable to use a hydrocarbon group having a straight-chain structure of which carbon number is in 4 to 30, more desirably 8 to 22. More, it is permissible that the reactive antistatic agent B has two or more hydrocarbon groups.

From the point of view of antistatic function, it is necessary that B has quaternary ammonium salt group and alkylene glycol chain (especially ethylene glycol chain). More, it is preferable that the carbon number of the alkylene glycol chain (especially ethylene glycol chain) is in 2 to 50, more preferably in 4 to 30.

As a copolymerizable reactive group of the B, for example, a photopolymerizable group is permissible. For example, (meth)acryloyl group, vinyl group and allyl group are can be listed up. In these groups, vinyl group and allyl group are preferable.

Next, a concrete example of the reactive antistatic agent B is shown.

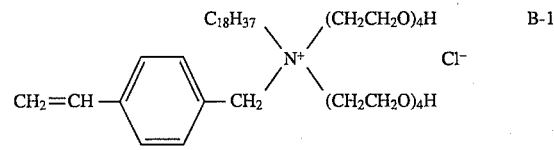

B-1 can be obtained as below.

166 g of an ethanol solution consisting of 50 g (80.39 millimole) of Amiet 308(a surface active agent produced by CAO Corporation), 14.72 g (96.47 millimole) of chloromethyl styrene (produced by Tokyo Kasei Kogyo Co., Ltd) and 0.13 g of hydroquinone monomethyleter (polymerization inhibitor) was refluxed for 48 hours. The reacted solution was distilled under reduced pressure and the compound B-1 represented by the above formula was obtained.

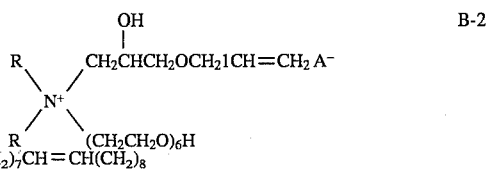

B-2 can be obtained as below.

Reacting dioleylamine with ethylene oxide at 150° C., 6 mole of ethylene oxide chain was added. Next, 50 ml of isopropylalcohol solution consisting of 12.5 g (16 millimole) of the obtained reacted compound, 9.13 g (80 millimole) of allylglycidyl ether, 8 ml of 2N—HCl, 4 ml of water and 20 mg of hydroquinonemonomethylether (polymerization inhibitor) was refluxed for 7 hours. Next, to remove chloroform, water and excess of allylglycidyl ether, ammonium solution was added into the reacted solution. Then, after washing the extracted solution by hydrochloric acid, it was washed repeatedly by water. And, after separating it with chloroform and distilling out the solvent, the compound B-2 represented by the above formula was obtained.

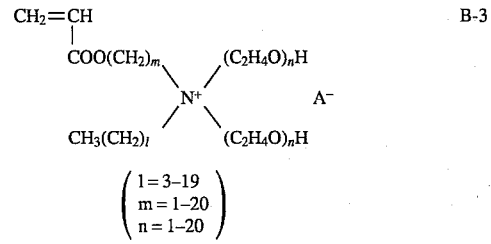

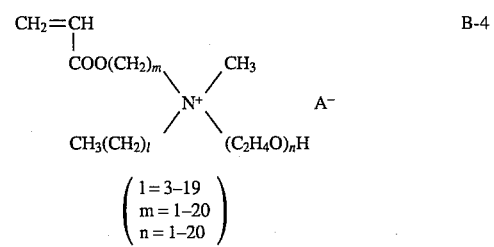

For the oligomer O used in the present invention, it is preferable that its main chain is structured by C—C linkage. However, amide linkage, imide linkage, urethane linkage, peptide linkage, ester linkage and ether linkage are permissible. That is, for a monomer composing the oligomer O, any type of (meth)acrylate, acrylamide, allyl, styrene or vinyl is permissible. However, it is preferable to use a monomer of (meth)acrylate type as shown in the above formulae [$O_{10}$], [$O_{11}$], [$O_2$] and [$O_3$].

Synthesizing method of the oligomer O depends on the type of its main chain, however, it can be obtained by reacting a monomer having quaternary ammonium salt group, a monomer having alkylene glycol chain (especially ethylene glycol chain) and a monomer having hydrocarbon group of which carbon number is 4 or more (especially 4 to 30, preferably saturated hydrocarbon having straight-chain of which carbon number is in 8 to 22).

Next, a concrete example of the oligomer O is explained.

Putting 20 part by weight of laurylacrylate, 40 part by weight of polyethylene glycol acrylate (chain length of polyethylene glycol is in 6 to 8), 40 part by weight of dimethylaminoethylacrylate and radical polymerization initiator V-65(produced by Wako Pure Chemicals Industries, Ltd.) into a reactor having a reflux condensor, a thermometer and a stirrer, polymerization was conducted under reflux of tetrahydrofuran for 10 hours.

Next, the resulted solution was added by methanol and further added by dimethyl sulfuric acid As a quaternarizer. Further, reflux was conducted.

After completion of the reaction, the solution was washed by hexane and precipitation was conducted again.

By the result, an oligomer O having quaternary ammonium salt group, alkyleneglycol chain and hydrocarbon group of which carbon number is 4 or more and not having polymerizable group was obtained.

For the silicone C used in the present invention, a polyether modified silicone (especially that presented by the following formula $[C_1]$) is preferable, more preferably polyether modified silicone having a reactive group (especially that presented by the following formula $[C_2]$).

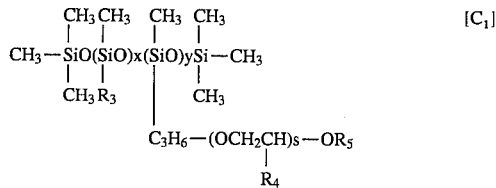

where, $R_3$ represents alkyl group of which carbon number is in 1 to 20. $R_4$, $R_5$ represent H or $CH_3$. x, y are integers in a rage of 1 to 1000 and s is an integer in a rage of 1 to 20.)

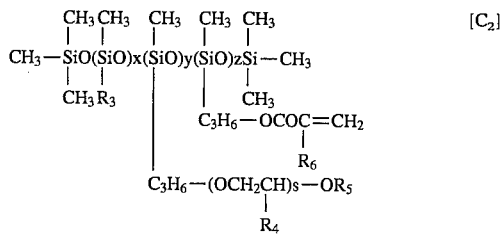

(where, $R_3$ represents alkyl group of which carbon number is in 1 to 20. $R_4$, $R_5$, $R_6$ represent H or $CH_3$. x, y and z are integers in a rage of 1 to 1000 and s is an integer in a rage of 1 to 20.)

As the result of considering compatibility with the compound A, polyether (polyoxyalkylene, for example, polyethylene glycol or polypropylene glycol, etc.) modified silicone represented by the above formulae $[C_1]$, $[C_2]$ was suitable. Especially, it was preferable polyethylene glycol (of which carbon number is in 2 to 100) modified compound, or a mixed compound of polyethylene glycol (of which carbon number is in 2 to 100) modified compound and polypropylene glycol (of which carbon number is 3 to 180) modified compound.

Where, it was preferable that x, y and z were in 5 to 200 respectively in the formulae $[C_1]$ and $[C_2]$.

Also, viscosity (at 250° C.) the silicone C is preferably in 10 to 5000 cSt (desirably 5 to 2000 cSt).

Additionally, the silicone C having the above-mentioned features adheres on the surface of a disk because polyether chain is compatible with the base resin. It is to be noted that a type having the copolymerizable reactive group (for example, (meth)acryloyl group) represented by the formula $[C_2]$ is preferable because it can be fixed on the surface of a base.

A concrete example of such silicone C is as below.

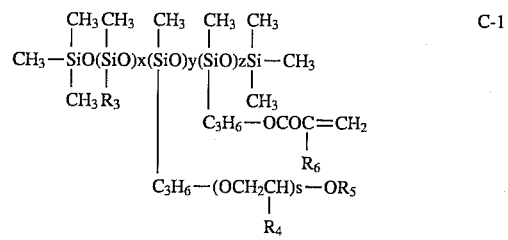

[where, $R_3=R_6=CH_3$, $R_4=R_5=H$, x=12, y+30 z=12, s=10]
The silicone C-1 was obtained as below.

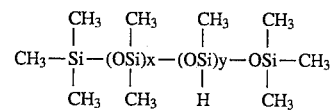

x, y = 12 on an average

Under nitrogen atmosphere, 10 part by weight of XF40-A2346 produced by Toshiba Silicone Co., Ltd.(hydrodiene modified polysiloxane compound represented by the above formula), 20 part by weight of PEGMA10 (polyethylene glycol monoacrylether of which average number of addition of ethyleneoxycide is 10 mole), 20 part by weight of toluene, 30 part by weight tetrahydrofuran and 0.02 part by weight of methylhydroquinone were mixed and stirred.

Next, the solution was added by 0.03 part by weight of potassium acetate 10% ethanol solution and 0.03 part by weight of isopropylalcohol solution containing 10% of $H_2PtCl_6 \cdot 6H_2O$, and reacted for 10 hours at 60° C. Additionally, 5.2 part by weight of allylmethacrylate was added and reacted for 7 hours. Next, cooled to room temperature and added by activated charcoal, it was stirred for 1 hour and filtered. Continuously the solvent was distilled off under reduced pressure and polyether modified silicone having methacrylate group represented by the above formula (C-1) was obtained.

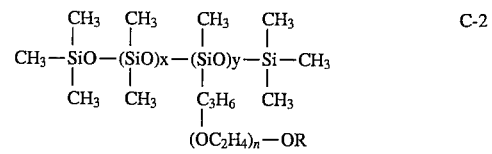

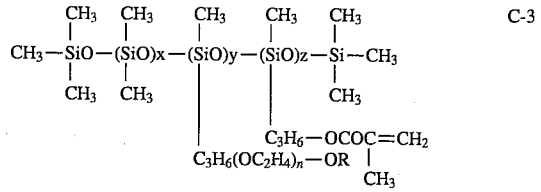

In the present invention, it is preferable that the reactive antistatic agent B is used in a ratio of 0.1 to 20 (desirably 0.5 to 5) part by weight per 100 part by weight of the compound A.

Further, when the oligomer O is used, it is preferable that the reactive antistatic agent B and the oligomer O are used respectively in a ratio of 0.1 to 20 (desirably 0.5 to 5) part by weight, 0.1 to 20 (desirably 0.5 to 5) part by weight per 100 part by weight of the compound A.

Also, when the silicone C is used, it is preferable that the reactive antistatic agent B is used in a ratio of 0.1 to 20 (desirably 1 to 5) part by weight, the silicone C is used in a ratio of 0.1 to 10 (desirably 0.5 to 5) part by weight per 100 part by weight of the compound A.

When all of them are used, it is preferable that the reactive antistatic agent B, the oligomer O and the silicone C are used respectively in a ratio of 0.1 to 20 part by weight, 0.1 to 20 part by weight and 0.1 to 10 part by weight per 100 part by weight of the compound A.

A polymerization initiator is not necessary when polymerization is conducted by irradiation of electronic beams or γ rays, however it is necessary when polymerization is conducted by irradiation of ultraviolet rays.

For example, the following are listed up for the purpose: acetophenone photopolymerization initiator such as 4-phenoxydichloro acetophenone, 4-t-butyldichloro acetophenone, diethoxy acetophenone, 2-hydroxy-2-methyl-phenyl-propane-1-on, etc.; benzoin photopolymerization initiator such as benzoin methyleter, benzoin isopropyleter, benzyldimethyl ketal, etc.; thioxenethone photopolymerization initiator such as thioxenethone, 2-chloruthioxenethone, 2,4-dimethylthioxenethone, 2,4-diethylthioxenethone, etc. Needless to say, the above polymerization initiators can be used alone or in combination with others.

It is preferable that the amount of addition of the initiator is not more than 10 part by weight per 100 part by weight of the compound A.

It is to be noted that various additives such as surface adjustor, ultraviolet absorbent and antioxidant and the like can be used.

Then, the above produced compound is diluted with methanol, ethanol, isopropylalcohol and the like. Coating this resulted solution on a surface and irradiating active energy rays (ultraviolet rays, electronic beams or γ rays) to it, polymerization is conducted. For example, when forming a protective film (a protective film of recording surface or both sides) of an disk, it can be applied using spin coating method in thickness of 0.5 to 20 μm, and cured by irradiation of ultraviolet rays.

By this film formed on the surface, a disk that is transparent, rich in resistance to scuffing, antistatic characteristics and resistance to dust can be obtained.

Also, in addition to the above features, sliding characteristics with a head is improved.

The film provided on the surface of a recording medium by the present invention has the following merits.

(1) High hardness by crosslink structure of the compound A.

(2) Long chain component of hydrocarbon of the reactive antistatic agent B promotes concentration of the reactive antistatic agent B itself on the surface layer in the curing step. By the reason, even a small amount of the reactive antistatic agent B show good antistatic characteristics. Also its transparency is excellent.

(3) The compound B has quaternary ammonium salt group and ethylene glycol chain. Therefore, it has good antistatic characteristics even under low humidity.

(4) The compound A and the reactive antistatic agent B are fixed on the surface of a base. Therefore, its antistatic ability is not lost if the surface is wiped up with a cloth and the like.

(5) When the oligomer O is used, the amount of the reactive antistatic agent B can be reduced. When the amount of the reactive antistatic agent B is reduced, its hardness becomes better. Additionally, film adherence is improved.

(6) When the silicone C is used, the surface energy is low. Therefore, its resistance to contamination is good. More, lubricating properties are also improved, so that the surface is kept against scratches

BRIEF DESCRIPTION ON DRAWINGS

In these schematics, 1 is a substrate, 2 is a recording layer (MO), 3 and 13 are coating films by the present invention, 4 is an overcoating film, 5 is an Al reflection film and 6 is a recording layer.

EXAMPLE

Example -1

60 part by weight of TMPTA produced by DAIICHI-KOGYO CO., Ltd.(ethylene oxide modified trimethylolepropane triacrylate=copolymerizable compound $A_1$ having tri-functional acrylate), 40 part by weight of A400 produced by SHIN-NAKAMURA CHEMICAL Co., Ltd.(polyethylene glycol diacrylate=copolymerizable compound $A_2$ having di-functional acrylate and of which length of ethyleneglycol chain is 9), 3 part by weight of compound represented by the above-mentioned formula (B-1) and 6 part by weight of Irg. 500 produced by CHIBA-GEIGY(JAPAN) Ltd.(an optical polymerization initiator) were mixed and fully solved at 50° C.

Next, the solution was coated in thickness of 0.5 to 20 μm, for example 4 μm, using spin coating method on a light entrance plane of 3.5" disk substrate made of polycarbonate Next, followed by curing the film by irradiation of ultraviolet rays (by a high pressure mercury lamp; 650 mW/cm$^2$, 1800 mJ/cm$^2$) under nitrogen gas current, thus a UV-cured coating film was provided on the surface.

Based on a substrate on which the film was provided, a magneto optical disk was produced.

Figure 1:
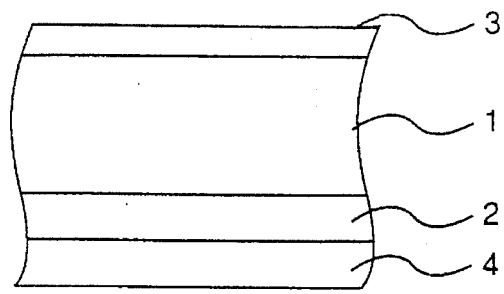
FIG. 1 is a schematic of a light modulation type magneto optical disk.
Figure 2:
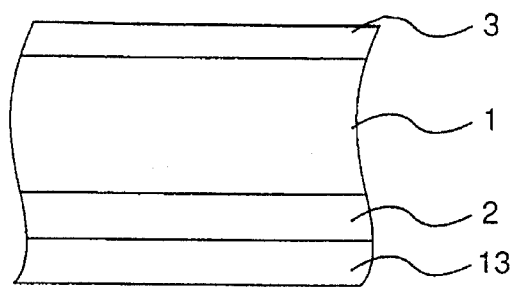
FIG. 2 is a schematic of a magnetic modulation type magneto optical disk.
Figure 3:
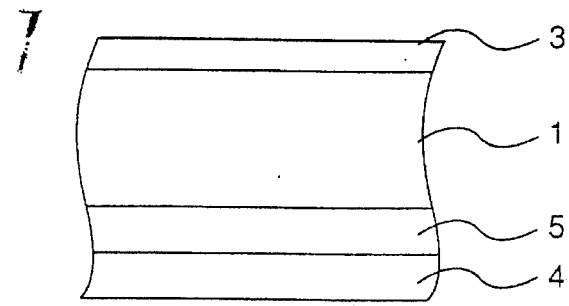
FIG. 3 is a schematic of a CD-ROM.
Figure 4:
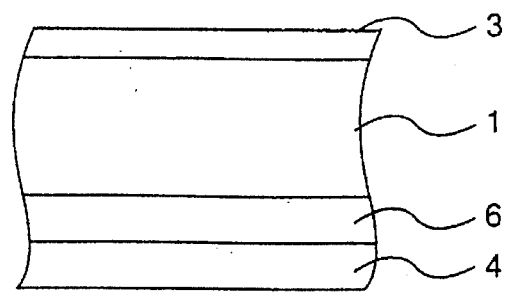
FIG. 4 is a schematic of a CD-R.

A schematic of a magneto optical disk obtained as above is shown in FIG. 1. In this schematic, 1 is a substrate, 2 is a recording layer, 3 is an above-mentioned UV-cured coating film and 4 is an overcoating film provided over the recording layer.

Example-2

70 part by weight of TMPTA, 30 part by weight of A400 and 2 part by weight of compound represented by the above-mentioned formula (B-2) were mixed and fully solved at 50° C.

Next, the solution was coated in thickness of 0.5 to 20 μm, for example 4 μm, using spin coating method on a 3.5" magneto optical disk substrate made of polycarbonate.

Next, followed by curing the film by irradiation of electronic beam (15 kV, 3 Mrad) under nitrogen gas current, thus a radioactive rays cured coating film was provided on the surface.

Based on a substrate on which the film was provided, a magneto optical disk was produced.

Example-3

In the process of example-1, changing the amount of the compound represented by the formula (B-1) to 1 part by weight and adding 5 part by weight of the oligomer [O] obtained by the above-mentioned process, a magneto optical disk was produced similarly to the example-1.

Example-4

70 part by weight of TMPTA, 30 part by weight of A400, 3 part by weight of compound represented by the above-mentioned formula (B-1), 1 part by weight of polyether modified silicone TSF4441(produced by Toshiba Silicone Co., Ltd.) and 3 part by weight of Irg. 651 were mixed and 10 part by weight of ethanol was added.

Next, the solution was coated in thickness of 0.5 to 20 μm, for example 4 μm, using spin coating method on a disk substrate made of polycarbonate of 3.5" diameter.

Next, followed by curing the film by irradiation of ultraviolet rays (by a high pressure mercury lamp; 650 mW/cm$_2$, 1800 mJ/cm$^2$) under nitrogen gas current, thus a UV-cured coating film was provided on the surface.

Based on a substrate on which the film was provided, a magneto optical disk was produced.

Example-5

70 part by weight of TMPTA, 30 part by weight of A400, 3 part by weight of compound represented by the above-mentioned formula (B-1), 1 part by weight of silicone represented by the above-mentioned formula (C-1) and 3 part by weight of Irg. 651 were mixed and 10 part by weight of ethanol was added.

Next, the solution was coated in thickness of 0.5 to 20 μm, for example 4 μm, using spin coating method on a disk substrate made of polycarbonate of 3.5" diameter.

Next, followed by curing the film by irradiation of ultraviolet rays (by a high pressure mercury lamp; 650 mW/cm$^2$, 1800 mJ/cm$^2$) under nitrogen gas current, thus a UV-cured coating film was provided on the surface.

Based on a substrate on which the film was provided, a magneto optical disk was produced.

Example-6

Using a compound (B-2) instead of the compound (B-1) in the example-4, a magneto optical disk was produced similarly to the process of the example-4.

Example-7

Using a compound (B-2) instead of the compound (B-1) in the example-5, a magneto optical disk was produced similarly to the process of the example-5.

Example-8

In the process of example-3, further adding 1 part by weight of polyether modified silicone TSF4441, a magneto optical disk was produced similarly to the process of the example-3.

Comparative Example-1

Quaternarizing the Amiet 320 by benzyl chloride, the following compound was obtained.

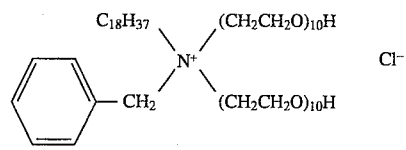

Using 5 part by weight of this compound instead of the compound (B-1) in the example-1, a magneto optical disk was produced similarly to the process of the example-1.

Comparative Example-2

Dioleylamine was reacted with ethylene oxide at 150° C., and six mole of ethylene oxide chains were added. Next, this resulted solution was quaternarized with dimethyl sulfate and a compound having the following structure was obtained.

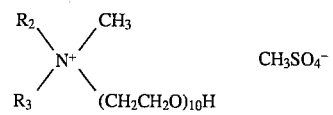

Using 2 part by weight of this compound instead of the compound (B-1) in the example-1, a magneto optical disk was produced similarly to the process of the example-1.

Comparative Example-3

Amiet 320 was quaternarized with benzyl chloride and a compound having the above structure was obtained.

Using this compound instead of the compound (B-1) in the example-4, a magneto optical disk was produced similarly to the process of the example-4.

Comparative Example-4

Amiet 320 was quaternarized with benzyl chloride and a compound having the above structure was obtained.

Using this compound instead of the compound (B-1) in the example-5, a magneto optical disk was produced similarly to the process of the example-5.

Characteristics

Increasing rate of error rate of each magneto optical disk obtained in each example was examined. The result is shown in Table-1.

TABLE 1

| | Increasing rate of error rate | |
|---|---|---|
| | Temperature: 24° C. Humidity: 30% RH | Temperature: 24° C. Humidity: 80% RH |
| EX-1 | within a digit | increased by a digit |
| EX-2 | within a digit | increased by a digit |
| EX-3 | within a digit | increased by a digit |
| EX-4 | within a digit | within a digit |
| EX-5 | within a digit | within a digit |
| EX-6 | within a digit | within a digit |
| EX-7 | within a digit | within a digit |
| EX-8 | within a digit | within a digit |

TABLE 1-continued

| | Increasing rate of error rate | |
|---|---|---|
| | Temperature: 24° C. Humidity: 30% RH | Temperature: 24° C. Humidity: 80% RH |
| Comparison EX-1 | more than 3 digits | more than 3 digits |
| Comparison EX-2 | more than 3 digits | more than 3 digits |
| Comparison EX-3 | more than 3 digits | more than 3 digits |
| Comparison EX-4 | more than 3 digits | more than 3 digits |

Byte error rate: Wiping off the disk surface with a mixed solution of ethanol-water(1:1), equipping it to a recording device, running it 30 days, Dirt chamber test (ASTM D2741-68) was performed. Then, error rate of the disk was measured.

Moreover, a coating film of each magneto optical disk obtained in the above example was examined, the results are shown in Table-2 and Table-3.

TABLE 2

| | (Initial characteristic, 24° C., 50% RH) | | | | |
|---|---|---|---|---|---|
| | A | B | C | D | E |
| EX-1 | $8 \times 10^{11}$ | 55° | 2H | 100/100 | ○ |
| EX-2 | $2 \times 10^{11}$ | 59° | 2H | 100/100 | ○ |
| EX-3 | $8 \times 10^{10}$ | 58° | 2H | 100/100 | ○ |
| EX-4 | $3 \times 10^{11}$ | 89° | 2H | 100/100 | ○ |
| EX-5 | $3 \times 10^{11}$ | 90° | 2H | 100/100 | ○ |
| EX-6 | $8 \times 10^{11}$ | 92° | 2H | 100/100 | ○ |
| EX-7 | $8 \times 10^{11}$ | 91° | 2H | 100/100 | ○ |
| EX-8 | $3 \times 10^{11}$ | 89° | 2H | 100/100 | ○ |
| Comparison EX-1 | $1 \times 10^{11}$ | 56° | 2H | 100/100 | ○ |
| Comparison EX-2 | $3 \times 10^{11}$ | 58° | 2H | 100/100 | ○ |
| Comparison EX-3 | $8 \times 10^{11}$ | 92° | 2H | 100/100 | ○ |
| Comparison EX-4 | $7 \times 10^{11}$ | 91° | 2H | 100/100 | ○ |

TABLE 3

| | (Test after wiping off, 24° C., 50% RH) | | | | |
|---|---|---|---|---|---|
| | A | B | C | D | E |
| EX-1 | $8 \times 10^{11}$ | 54° | 2H | 100/100 | ○ |
| EX-2 | $2 \times 10^{11}$ | 53° | 2H | 100/100 | ○ |
| EX-3 | $9 \times 10^{10}$ | 55° | 2H | 100/100 | ○ |
| EX-4 | $3 \times 10^{11}$ | 89° | 2H | 100/100 | ○ |
| EX-5 | $3 \times 10^{11}$ | 90° | 2H | 100/100 | ○ |
| EX-6 | $8 \times 10^{11}$ | 95° | 2H | 100/100 | ○ |
| EX-7 | $8 \times 10^{11}$ | 94° | 2H | 100/100 | ○ |
| EX-8 | $6 \times 10^{11}$ | 90° | 2H | 100/100 | ○ |
| Comparison EX-1 | $4 \times 10^{13}$ | 55° | 2H | 100/100 | ○ |
| Comparison EX-2 | $6 \times 10^{13}$ | 57° | 2H | 100/100 | ○ |
| Comparison EX-3 | $3 \times 10^{13}$ | 90° | 2H | 100/100 | ○ |
| Comparison EX-4 | $13 \times 10^{13}$ | 90° | 2H | 100/100 | ○ |

A: Surface electrical resistance
B: Contact angle
C: Hardness
D: Adhesion
E: Appearance
*Surface electrical resistance: Applied voltage 500V(DC), Value in a minute, Ring electrode(conform to JISK-6911) Unit is Ω/□, Measured at 24° C., 50% RH
*Contact angle: Putting a substrate horizontally, dropping water (pure water) on it, Contact angle was measured using CA-Z150 produced by Kyowa Interface Science Co., Ltd. Measurement was performed at 24° C., 50% RH
*Hardness test: Pencil hardness test (JIS K5400-1979)
*Adhesion test: Cross-cut adhesion test using cellophane tape
*Appearance:
○ Transparent and smooth surface
△ A few cloudiness and irregularity
X Excessive cloudiness and irregularity

TABLE 3-continued

| (Test after wiping off, 24° C., 50% RH) | | | | |
|---|---|---|---|---|
| A | B | C | D | E |

*Test after wiping off: Wiping off the surface 100 times with BEMCOT M-3 (produced by Asahi Chemical) impregnated by ethanol, surface electrical resistance and contact angle were measured.

Moreover, Coefficient of dynamic friction of the disk obtained in example-4 was measured after rotated in being contacted with a magnetic head removed from the SONY recorder MD drive for 2,000 hours in 3,000 rpm at 24° C. and 40% RH. As the result coefficient of dynamic friction of the disk was about 0.2 and any difference before and after test can not be found. Also, any dust and dirt were not found on the coating surface.

What is claimed is:

1. A recording medium comprising a film provided on a surface of said recording medium, wherein said film comprises a copolymer formed by polymerizing a composition which comprises:

(a) a compound A having at least one (meth)acryloyl group; and (b) a reactive antistatic agent B in the form of a quaternary ammonium salt having attached to the nitrogen thereof one or two alkylene glycol chains, two or one hydrocarbon groups each containing four or more carbons, and a copolymerizable double-bond-containing group.

2. The recording medium of claim 1, wherein said film additionally comprises an oligomer, wherein said oligomer is formed by reacting:

(a) 5 to 70% by weight of a monomer per 100% weight of oligomer represented by the following formula,

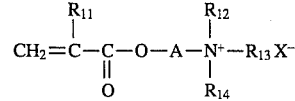

where, $R_{11}$ represents H or $CH_3$, $R_{12}$, $R_{13}$, $R_{14}$ represents H, alkyl group or hydroxy-alkyl group, A represents alkylene group or hydroxy-alkyl group, $X^-$ is an anion; (b) 10 to 80% by weight of a monomer per 100% weight of oligomer represented by the following formula,

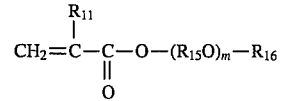

where, $R_{11}$, represents H or $Ch_3$, $R_{15}$ represents alkylene group, $R_{16}$ represents H, alkyl group or aryl group, m is an integer in a range of 1 to 25; and (c) 10 to 70% by weight of a monomer per 100% weight of oligomer represented by the following formula,

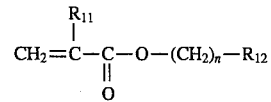

where, $R_{11}$ represents H or $CH_3$, $R_{12}$ represents H or (meth)acryloyl group, n is an integer in a range of 4 to 30.

3. The recording medium of claim 1, wherein said film additionally comprises an oligomer, wherein said oligomer is formed by reacting:

(a') 5 to 70% by weight of an amine monomer per 100% weight of oligomer represented by the following formula,

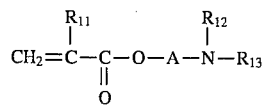

where, $R_{11}$ represents H or $CH_3$, $R_{12}$, $R_{13}$ represent H, alkyl group or hydroxy-alkyl group, A represents alkylene group or hydroxy-alkyl group;

(b) 10 to 80% by weight of a monomer per 100% weight of oligomer represented by the following formula,

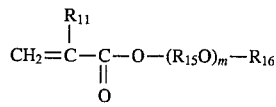

where, $R_{11}$ represents H or $Ch_3$, $R_{15}$ represents alkylene group, $R_{16}$ represents H, alkyl group or aryl group, m is an integer in a range of 1 to 25; and (c) 10 to 70% by weight of a monomer per 100% weight of oligomer represented by the following formula,

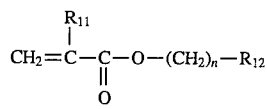

where, $R_{11}$ represents H or $CH_3$, $R_{12}$ represents H or (meth)acryloyl group, n is an integer in a range of 4 to 30; and quaternarizing the reaction product.

4. The recording medium of claim 1, wherein said composition comprises a silicone compound having attached thereto polyether group(s).

5. The recording medium of claim 1, wherein said compound A comprises at least one compound selected from the group consisting of (meth)acrylate having three or more (meth)acryloyl groups and (meth)acrylate having two (meth)acryloyl groups and an ethylene gylcol chain.

6. The recording medium of claim 1, wherein said compound A comprises:

(a) a compound $A_1$ selected from the group consisting of (meth)acrylate having three or more (meth)acryloyl groups; and (b) a compound $A_2$ selected from the group consisting of (meth)acrylate having two (meth)acryloyl groups and an ethylene glycol chain;

wherein, the amount of $A_2$ is in the range of 10 to 100 part by weight per $A_1$ of 100 part by weight.

7. The recording medium of claim 1, wherein said reactive antistatic agent B comprises at least one reactive group selected from vinyl and allyl as part of the copolymerizable double-bond-containing group, and has a structure represented by the following formula

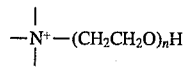

where, n is an integer in a range of 1 to 25.

8. The recording medium of claim 1, wherein said reactive antistatic agent B is represented by the following formula,

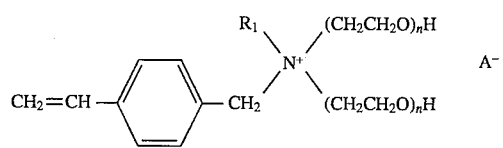

where, $R_1$ represents hydrocarbon group of which carbon number is four or more, $A^{31}$ represents an anion, n is an integer in a range of 1 to 25.

9. The recording medium of claim 1, wherein said reactive antistatic agent B is represented by the following formula

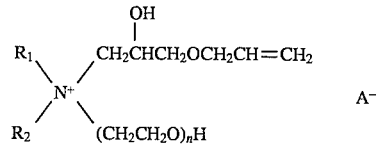

where, $R_1$ and $R_2$ represent hydrocarbon group of which carbon number is four or more, $A^-$ represents an anion, n is an integer in a range of 1 to 25.

10. The recording medium of claim 1, wherein said reactive antistatic agent B in used in an amount of 0.1 to 20 part by weight of said compound A.

11. The recording medium of claim 2, wherein said composition comprises a silicone compound having attached thereto polyether group(s).

12. The recording medium of claim 2 wherein said reactive antistatic agent B and said oligomer are used respectively in an amount of 0.1 to 20 part by weight, 0.1 to 20 part by weight per 100 part by weight of said compound A.

13. The recording of claim 3, wherein said reactive antistatic agent and said oligomer are used respectively in amount of 0.1 to 20 part by weight, 0.1 to 20 part by weight per 100 part by weight of said compound A.

14. The recording medium of claim 4, wherein said silicone compound has attached thereto reactive double-bond-containing group(s).

15. The recording medium of claim 4, wherein said reactive antistatic agent B and said silicone compound are used respectively in an amount of 0.1 to 20 part by weight, 0.1 to 10 part by weight per 100 part by weight of said compound A.

16. The recording medium of claim 11, wherein said silicone compound has attached thereto reactive double-bond-containing group(s).

17. The recording medium of claim 11, wherein said reactive antistatic agent B, said oligomer and said silicone compound are used respectively in an amount of 0.1 to 20 part by weight, 0.1 to 20 part by weight and 0.1 to 20 part by weight per 100 part by weight of said compound A.

18. The recording medium of claim 14, wherein said silicone [C] compound is represented by the following formula,

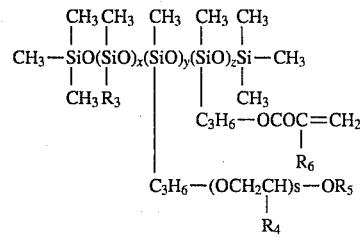

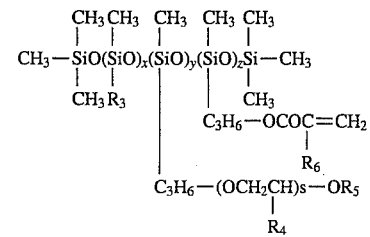

where, $R_3$ represents alkyl group of which carbon number is 1 to 20, $R_4$, $R_5$ and $R_6$ represent H or $Ch_3$, x, y and z are integers in a range of 1 to 1000 and s is an integer in a range of 1to 20.

19. The recording medium of claim 16, wherein said silicone compound is represented by the following formula, where, $R_3$ represents alkyl group of which carbon number is 1 to 20, $R_4$, $R_5$ and $R_6$ represent H or $Ch_3$, x, y, and z are integers in a range of 1 to 1000 and s is an integer in a range of 1 or 20.

* * * * *